United States Patent
Dowgwillo et al.

(10) Patent No.: US 10,775,265 B2
(45) Date of Patent: Sep. 15, 2020

(54) TEST FIXTURE TO MEASURE THE AVERAGE SKIN FRICTION OF ANISOTROPIC SURFACES

(71) Applicant: The Boeing Company, Chicago, IL (US)

(72) Inventors: Robert M. Dowgwillo, Chicago, IL (US); Jay Wiggins, Chicago, IL (US); Bradley Rafferty, Chicago, IL (US); Daniel P. Brzozowski, Chicago, IL (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 16/049,714

(22) Filed: Jul. 30, 2018

(65) Prior Publication Data
US 2019/0360892 A1   Nov. 28, 2019

Related U.S. Application Data

(60) Provisional application No. 62/675,087, filed on May 22, 2018.

(51) Int. Cl.
| | |
|---|---|
| *G01M 9/06* | (2006.01) |
| *G01M 9/04* | (2006.01) |
| *G01N 19/02* | (2006.01) |
| *G01N 19/00* | (2006.01) |

(52) U.S. Cl.
CPC .............. *G01M 9/062* (2013.01); *G01M 9/04* (2013.01); *G01N 19/00* (2013.01); *G01N 19/02* (2013.01)

(58) Field of Classification Search
CPC ........ G01M 9/062; G01M 9/04; G01N 19/02; G01N 3/04; G01N 19/00
See application file for complete search history.

(56) References Cited

U.S. PATENT DOCUMENTS

| | | | |
|---|---|---|---|
| 7,921,731 B2* | 4/2011 | Bajikar ............... | G01L 1/18 73/760 |
| 2018/0094992 A1* | 4/2018 | Meritt ............... | G01M 5/0083 |

OTHER PUBLICATIONS

Loposer, J. D. et al., "Flight Measurements of Average Skin-Friction Coefficients on a Parabolic Body of Revolution (NACA RM-10) at MACH Nos. from 1.0 to 3.7", NACA Research Memorandum, Aug. 1954, 33 pgs.
Smith, Donald W. et al., "Skin-Friction Measurements in Incompressible Flow", NASA Technical Report, 1959, 46 pgs.
Zuniga, Fanny A. et al., "Flight Test Results of Riblets at Supersonic Speeds", NASA Technical Memorandum 4387, Jun. 1992, 37 pgs.

* cited by examiner

*Primary Examiner* — David Z Huang
(74) *Attorney, Agent, or Firm* — Kwan & Olynick LLP

(57) ABSTRACT

A test fixture for measuring the skin friction of anisotropic surface finish on a material is described. The test fixture can be utilized in a wind tunnel. The test fixture can include a plate having a cavity configured to receive a circular specimen disk. A motor can be coupled to the plate to rotate the circular specimen disk. During a test, a fluid can flow over the plate in a particular direction and the motor can rotate the circular specimen disk to determine the effect of the flow angle on the average skin friction coefficient of a surface finish of a material. The circular specimen disk can easily be attached and detached from the test fixture to allow circular specimen disks with different surface finishes to be tested.

20 Claims, 7 Drawing Sheets

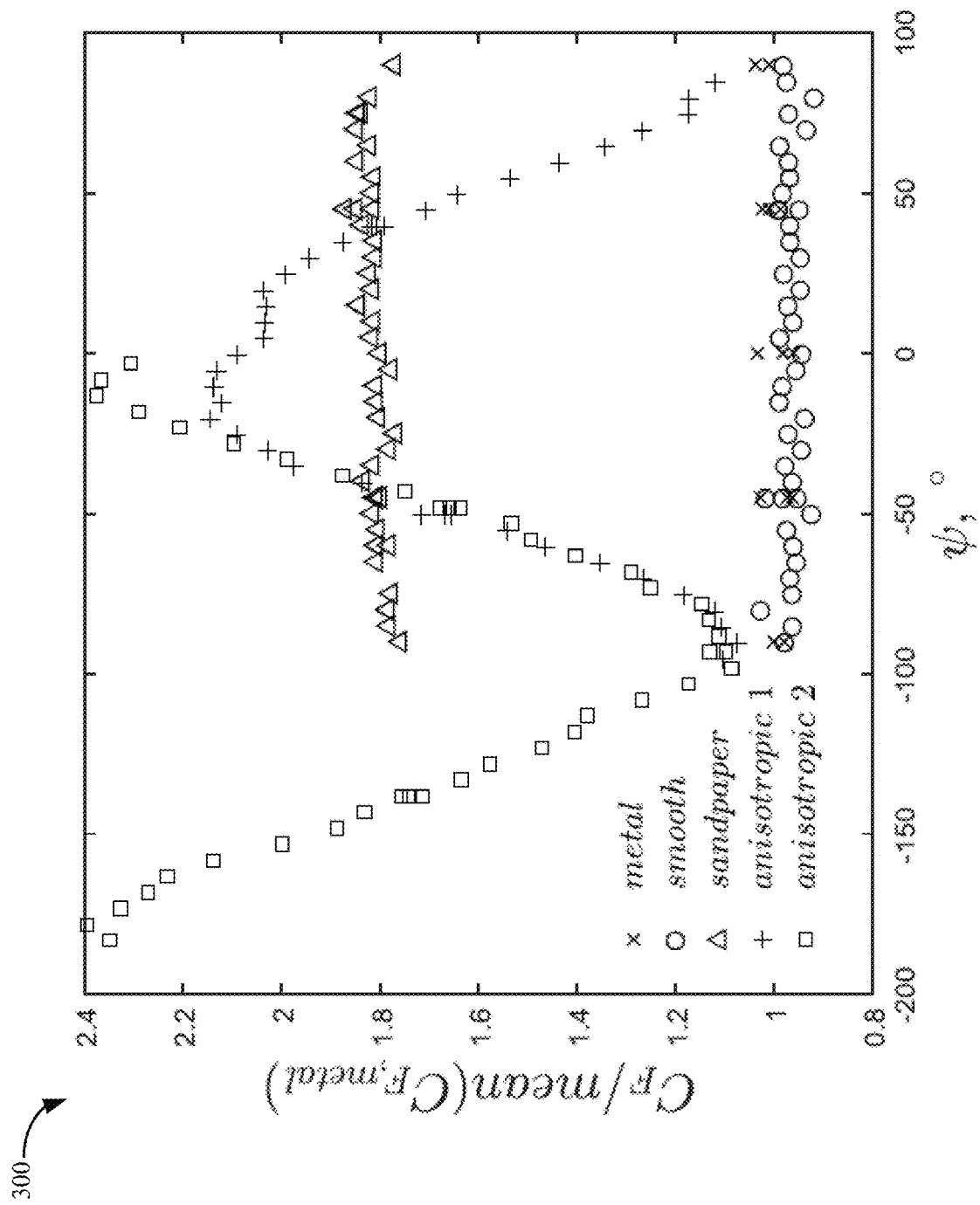

TEST FIXTURE TO MEASURE THE AVERAGE SKIN FRICTION OF ANISOTROPIC SURFACES

CROSS-REFERENCE TO RELATED APPLICATIONS

This patent application claims priority under 35 U.S.C. § 119(e) to U.S. Provisional Patent Application Ser. No. 62/675,087, filed May 22, 2018, titled, "A Test Fixture to Measure the Skin Friction of Anisotropic Surface," which is incorporated by reference in its entirety and for all purposes.

TECHNICAL FIELD

This disclosure generally relates to aerodynamic skin friction. More specifically, this disclosure relates to a test fixture for measuring aerodynamic skin friction of an anisotropic surface finish on a material.

BACKGROUND

An essential element in the design of flight vehicles is the prediction of aerodynamic drag. The aerodynamic drag includes form drag and skin friction drag. The form drag is associated with pressure changes that occur as the fluid flows around the vehicle in accordance with a shape of the vehicle. The skin friction drag arises from the friction of the fluid against the "skin" of the vehicle. The aerodynamic drag and hence the skin friction drag is also important for other types of vehicles which move through a fluid, such as trains, cars and submarines.

The skin friction drag arises from the interaction between the fluid and the skin of the vehicle. The skin can refer to the irregular shape of the wetted surface of the vehicle. For a given shape of a flight vehicle and specified flight conditions, the skin friction drag will vary depending on the surface finish used to construct the skin of vehicle. For example, the skin friction drag will be different for a polished metal skinned vehicle versus a vehicle with a skin with a sand paper like finish.

The interaction between a fluid and a surface finish that produces the skin friction drag can be characterized by a skin friction coefficient which is a ratio of the local wall shear stress divided by the free stream dynamic pressure. The skin friction coefficient is a function of the surface finish properties and the flow conditions. In particular, if the surface finish is anisotropic, the skin friction coefficient varies according to a flow direction over the surface finish.

The accurate determination of the skin friction coefficient for a particular surface finish involves a complex set of measurements. For many approaches, the instrumentation is fragile, difficult to initially calibrate, difficult to install and/or keep consistently calibrated as test conditions change during a measurement. Further, the test fixtures used to determine a skin friction coefficient are often customized for a particular measurement. Thus, the test fixtures are redone from test to test. In view of the above, new methods and apparatus are needed for characterizing the skin friction coefficient of a surface finish on a material.

SUMMARY

A test fixture for measuring the skin friction of a surface finish of material is described. The test fixture can be utilized in a fluid tunnel. The test fixture can include a plate having a cavity configured to receive a circular specimen disk. A motor can be coupled to the plate to rotate the circular specimen disk. During operation of the test fixture in the fluid tunnel, a fluid can flow over the plate in a particular direction and the motor can rotate the circular specimen disk relative to the direction of the fluid flow to determine the effect of the flow angle on the average skin friction coefficient of a surface finish of a material. For an anisotropic surface finish, the average skin friction coefficient can vary according to the flow angle.

In more detail, one aspect of the disclosure can be generally characterized as test fixture for measuring skin friction of a surface finish of a material. The test fixture can have 1) a plate including a circular cavity configured to receive a circular specimen disk having the surface finish where the surface finish is aligned with a top surface of the plate when the circular specimen disk is placed in the circular cavity and where during operation of the test fixture a fluid flows over the plate and the circular specimen disk; 2) a motor assembly, coupled to plate, configured to rotate the circular specimen disk through a plurality of angles relative to a direction of the fluid flow during operation of the test fixture; 3) a first pressure rake, coupled to the plate, positioned upstream of the circular specimen disk, configured to measure first total pressures throughout a height of an upstream boundary layer; 4) a second pressure rake, coupled to the plate, positioned downstream of the circular specimen disk, configured to measure second total pressures throughout a height of a downstream boundary layer; and 5) a plurality of static pressure taps in a top surface of the plate for measuring static pressures on the top surface of the plate where the first total pressures, the second total pressures and the static pressures are used to determine the skin friction of the surface finish of the material as a function of the plurality of angles.

In particular examples, the first pressure rake can include a plurality of pressure probes each extending from a body of the first pressure rake, each arranged along a line perpendicular to the top surface of the plate and each substantially parallel to the top surface of the plate. The tips of the plurality of the pressure probes can be aligned with a point on the circular specimen disk which is most upstream in a flow of the fluid over the circular specimen disk. Further, the second pressure rake can include a plurality of pressure probes each extending from a body of the second pressure rake, each arranged along a line perpendicular to the top surface of the plate and each substantially parallel to the top surface of the plate where tips of the pressure probes are aligned with a point on the circular specimen disk which is most downstream in a flow of the fluid over the circular specimen disk.

In further examples, a portion of the plurality of static pressure taps can be arranged in a spanwise line across the plate upstream of the circular specimen disk. A portion of the plurality of static pressure taps can be arranged in a streamwise line along the plate extending from upstream of the circular specimen disk to downstream of the circular specimen disk. The test fixture can additionally include a communication interface configured to receive command signals for the motor assembly, wherein the command signals are used to command the motor assembly to rotate the circular specimen disk during the operation of the test fixture.

In other examples, the test fixture can further include a plurality of supports for raising the test fixture above a floor of a test section of a fluid tunnel. Further, one or more fairings can be designed to cover components extending from a bottom of the plate where the one or more fairings are shaped to reduce flow disturbances resulting from the fluid flowing over the fairings. In addition, a body of the first pressure rake or a body of the second pressure rake is shaped to reduce downstream flow disturbances resulting from the fluid flowing around the body. Yet further, the plate can include a leading edge and a trailing edge and wherein the trailing edge includes attachment points for receiving a trailing edge control surface. The trailing edge control surface can be designed to gradually return the flow to the free stream condition to promote a benign wake. Finally, to reduce downstream flow disturbances, the plate can include a leading edge and a trailing edge, where the leading edge is shaped to gradually transition from a finite radius of curvature associated with the leading edge to an infinite radius of curvature associated with the flat top surface of the plate.

Another aspect of the disclosure can be generally related to a material testing system. The material testing system can include: 1) a fluid tunnel including a test section, a fluid driver system for driving a fluid through the test section and a control system for controlling the fluid driver system and 2) a test fixture, positioned in the test section, for measuring skin friction of a surface finish of a material. In various examples, the fluid driver system can be configured to drive a gas or a liquid through the test section.

The test fixture can include a plate including a circular cavity configured to receive a circular specimen disk covered in the surface finish. The surface finish can be aligned with a top surface of the plate when the circular specimen disk is placed in the circular cavity. In some examples, a top surface of the surface finish can be aligned with the top surface of the plate. In other examples, a portion of the surface finish can extend above the top surface of the plate. During operation of the test fixture, such as during a test run, the fluid flows over at least the top surface of the plate and the top surface of the circular specimen disk.

In addition, the test fixture can include a motor assembly, coupled to plate, configured to rotate the circular specimen disk through a plurality of angles relative to a direction of the fluid flow during operation of the test fixture. Further, the test fixture can include a first pressure rake, coupled to the plate, positioned upstream of the circular specimen disk, configured to measure first total pressures throughout a height of an upstream boundary layer and a second pressure rake, coupled to the plate, positioned downstream of the circular specimen disk, configured to measure second total pressures throughout a height of a downstream boundary layer. Yet further, the test fixture can include a plurality of static pressure taps in a top surface of the plate for measuring static pressures on the top surface of the plate. The first total pressures, the second total pressures and the static pressures can be used to determine the skin friction of the surface finish of the material as a function of the plurality of angles.

In particular examples, the plate is mounted in the test section such that the top surface of the plate is flush with a bottom surface of the test section. Further, a suction mechanism can be installed in the bottom surface of the test section, upstream of the plate, to eliminate and remove the effect of a bottom surface boundary layer just upstream of the plate. Yet further, supports configured to raise the plate above a bottom surface of the test section to allow the fluid to flow over the top surface of the plate and a bottom surface of the plate can be coupled to the plate.

In additional examples, gaps between spanwise edges of the plate and side walls of the test section can be sealed to minimize a leakage of fluid between the top surface of the plate and the bottom surface of the plate. Further, the control system can be configured to control the fluid driver system to maintain an approximately constant unit Reynolds number during the operation of the test fixture. Yet further, the control system can be configured to control the motor assembly to rotate the circular specimen disk through the plurality of angles during the operation of the test fixture.

Yet another aspect of the present disclosure can be generally characterized as a method of determining skin friction of an anisotropic surface finish. The method can be generally characterized as comprising: 1) controlling a fluid tunnel to establish fluid flow over a test fixture positioned within a test section of the fluid tunnel, where the test fixture includes; i) a plate including a circular cavity configured to receive a circular specimen disk having the anisotropic surface finish wherein, during operation of the test fixture, the fluid flows over at least a top surface of the plate and a top surface of the circular specimen disk; ii) a motor assembly, coupled to plate, configured to rotate the circular specimen disk through a plurality of angles relative to a direction of the fluid flow during the operation of the test fixture; iii) a first pressure rake, coupled to the plate, positioned upstream of the circular specimen disk, configured to measure first total pressures throughout a height of an upstream boundary layer; iv) a second pressure rake, coupled to the plate, positioned downstream of the circular specimen disk, configured to measure second total pressures throughout a height of a downstream boundary layer; and v) a plurality of static pressure taps in a top surface of the plate for measuring static pressures on the top surface of the plate; 2) measuring the first pressures, the second pressures and the static pressures when the circular specimen disk is at a first angle relative to the direction of the fluid flow during the operation of the test fixture; 3) commanding the motor assembly to rotate the circular specimen disk to a second angle relative to the direction of the fluid flow during the operation of the test fixture; 4) measuring the first total pressures, the second total pressures and the static pressures at the second angle and 5) based upon the first total pressures, the second total pressures and the static pressures at the first angle and at the second angle, determining the skin friction coefficient of the anisotropic surface finish as a function of the first angle and the second angle.

BRIEF DESCRIPTION OF THE DRAWINGS

Figure 1A:
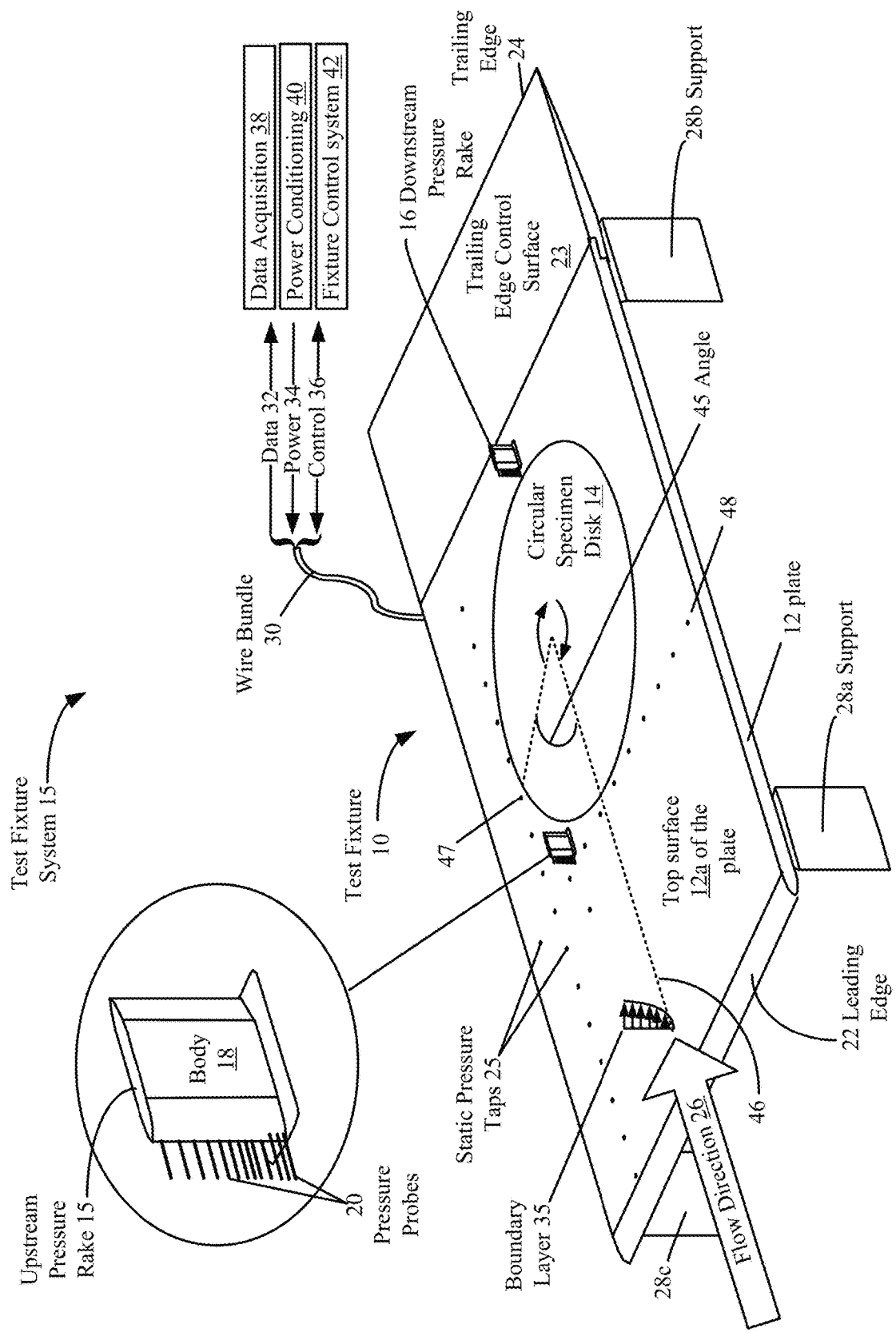

Having thus described examples of the disclosure in general terms, reference will now be made to the accompanying drawings, which are not necessarily drawn to scale, and wherein like reference characters designate the same or similar parts throughout the several views, and wherein:

FIG. 1A is a perspective top view illustrating a test fixture for measuring skin friction, according to one aspect of the present disclosure.

Figure 1B:
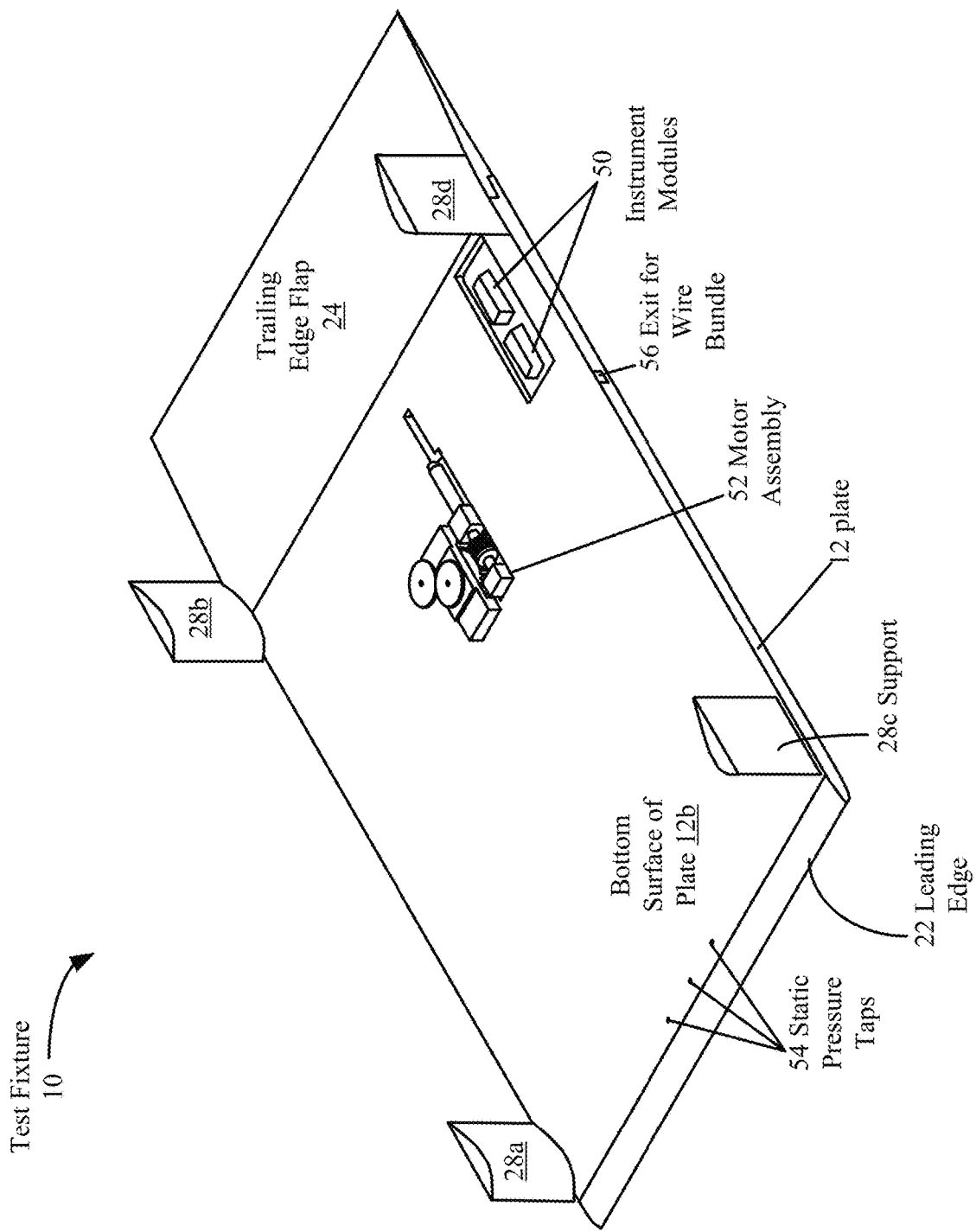

FIG. 1B is a perspective bottom view illustrating a test fixture for measuring skin friction, according to one aspect of the present disclosure.

Figure 1C:
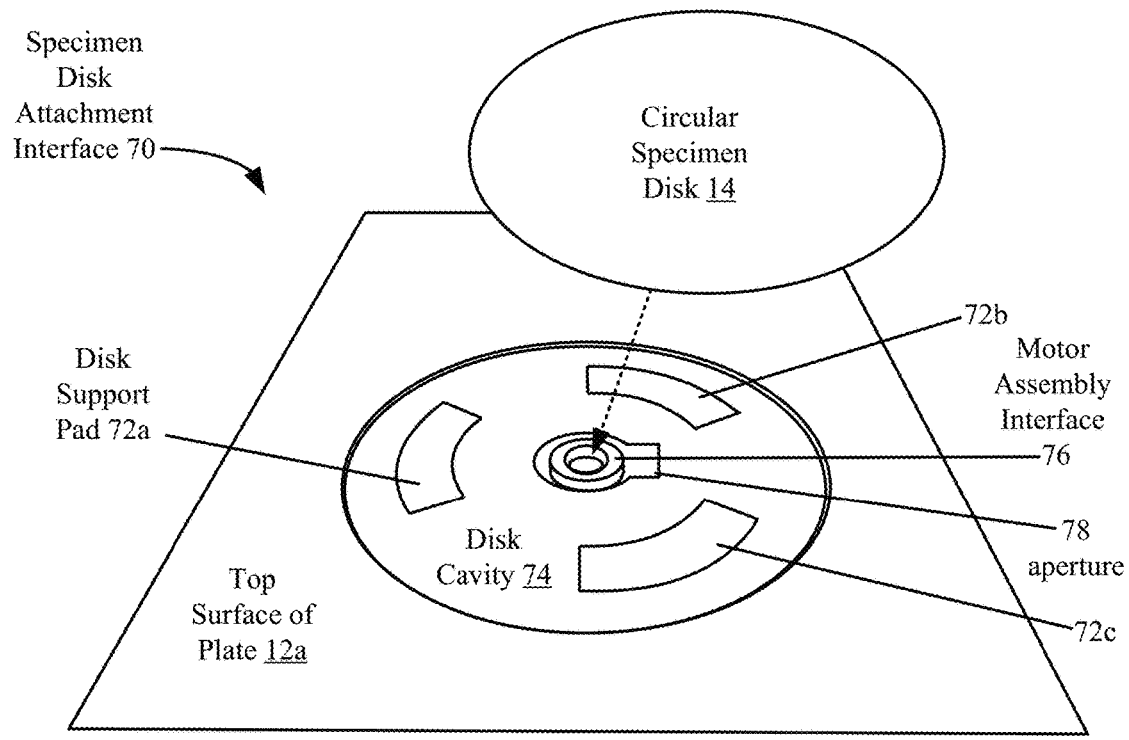

FIG. 1C is a perspective top view of a test fixture illustrating the attachment interface for a circular specimen disk used with the test fixture, according to one aspect of the present disclosure.

Figure 1D:
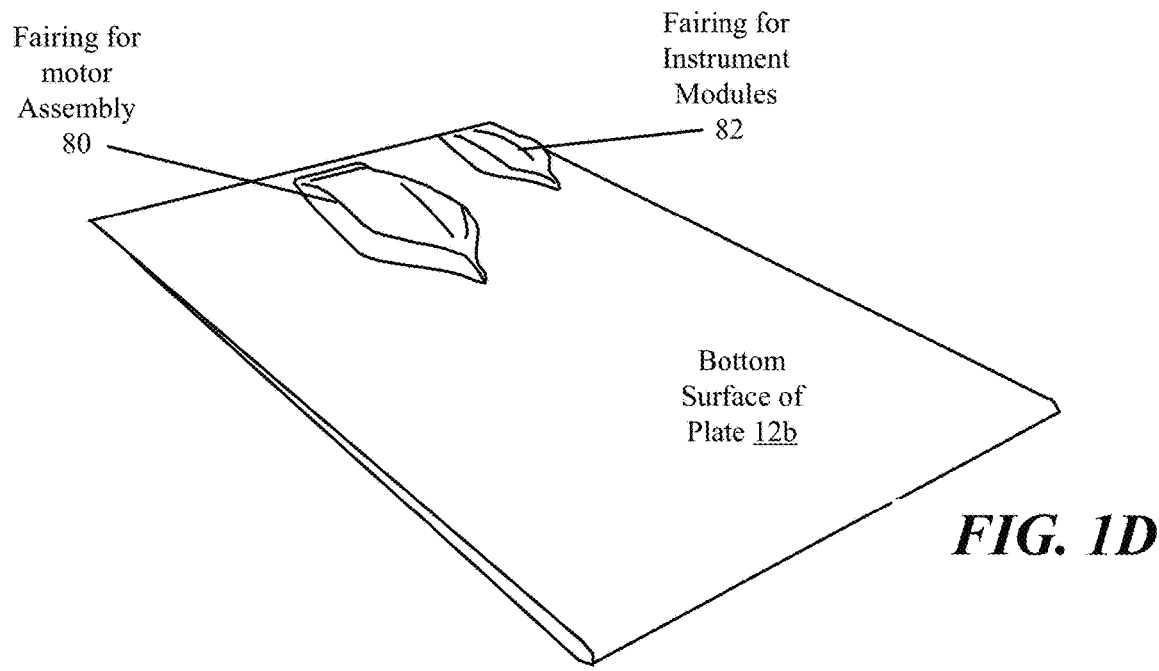

FIG. 1D is a perspective bottom view of a test fixture illustrating fairings used to cover components extending from a bottom of the test fixture, according to one aspect of the present disclosure.

Figure 2:
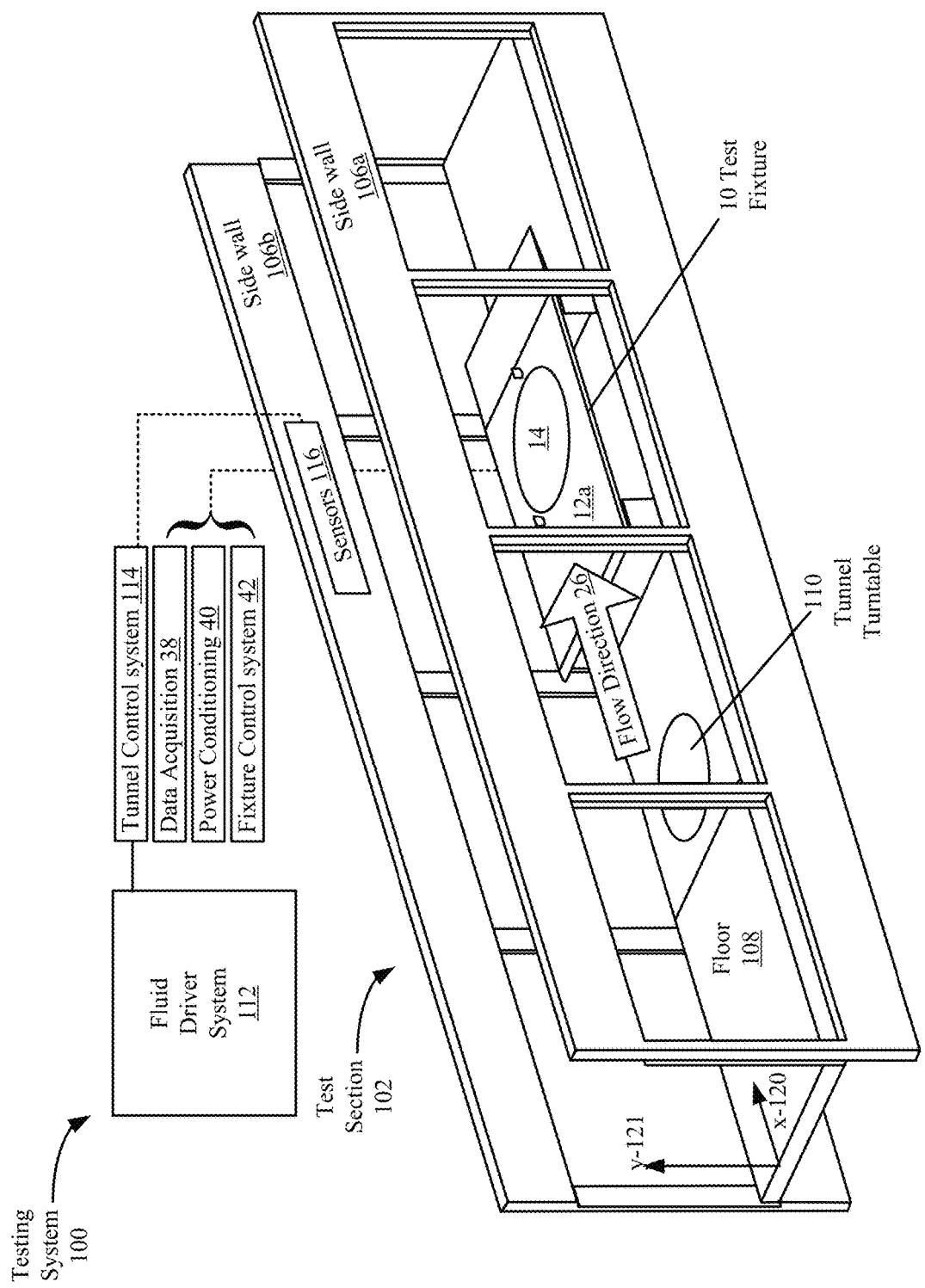

FIG. 2 is a perspective view of the test fixture installed in a test section of a fluid tunnel according to one aspect of the present disclosure.

Figure 3:
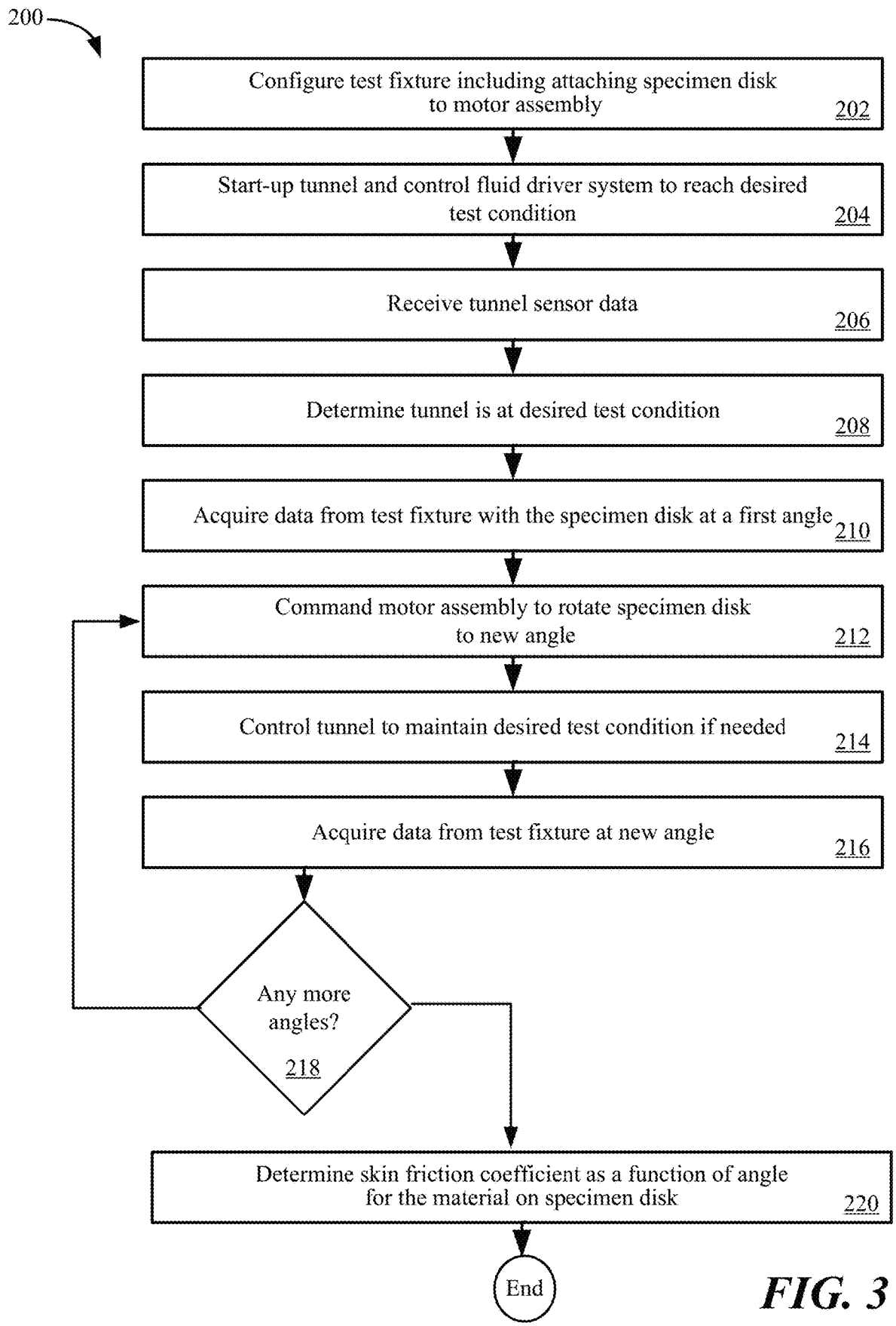

FIG. 3 is a method of determining skin friction of an anisotropic surface finish using a test fixture with a rotatable specimen disk according to aspects of the present disclosure.

FIG. 4A is a plot of skin friction coefficient determined from measurements made using a test fixture with a rotatable specimen disk, according to one aspect of the present disclosure.

Figure 4B:
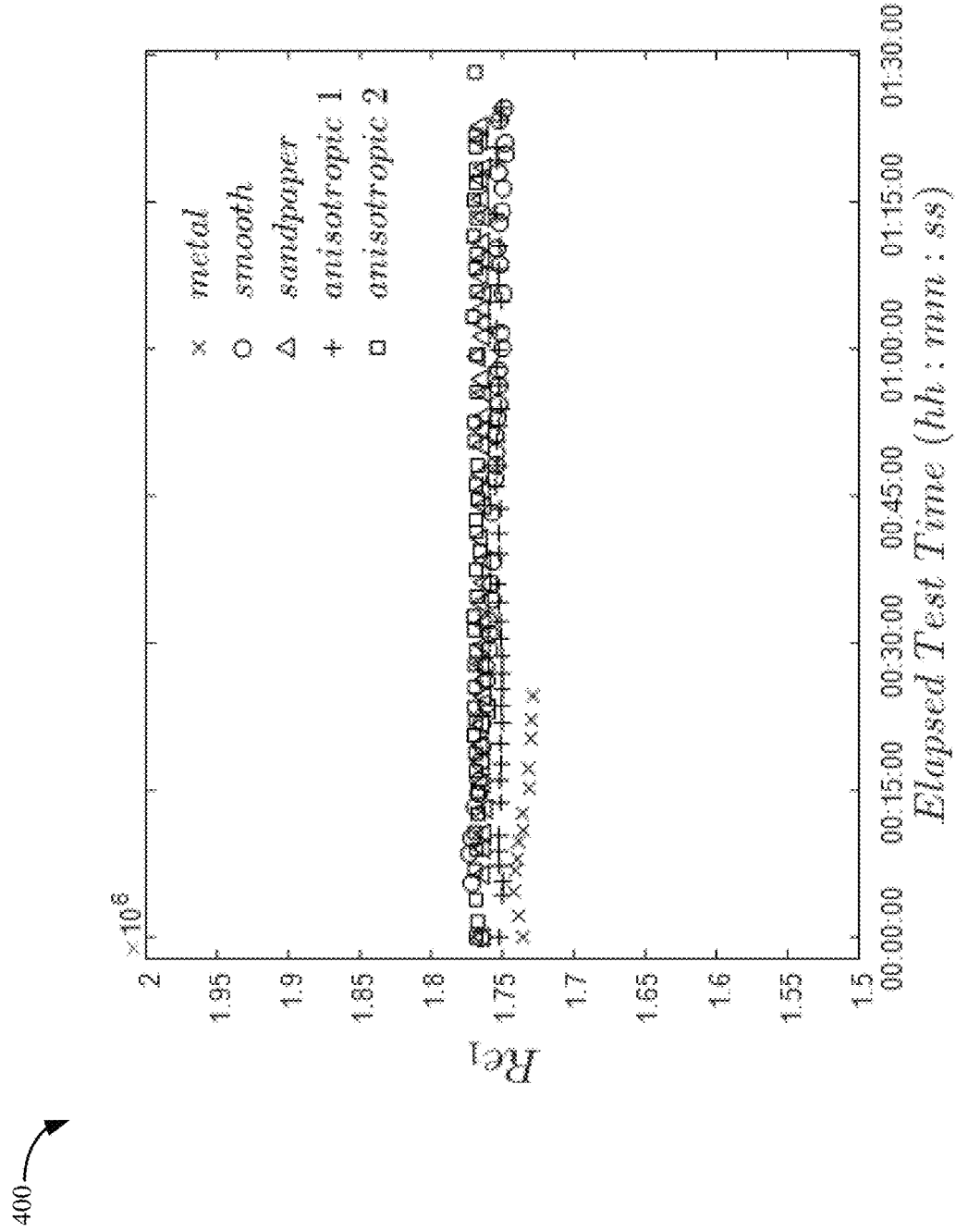

FIG. 4B is a plot of the unit Reynolds number as a function of the test e for the test runs in FIG. 4A, according to one aspect of the present disclosure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Methods and apparatus for determining the average skin friction coefficient of a surface finish of a material are described. The average skin friction coefficient can be determined using flat plate boundary layer theory. Thus, a test fixture and instrumentation can be utilized which allows the fluid flow over a flat plate to be characterized. The test fixture can be utilized in a fluid tunnel. Flat plate boundary layer theory can be used to derive the skin friction coefficient. Details of this theory are described in more detail with respect to "U.S. Provisional Patent Application Ser. No. 62/675,087, filed May 22, 2018, titled, "A Test Fixture to Measure the Skin Friction of Anisotropic Surface," which is incorporated herein.

The surface finish of a material can include a roughness pattern and a roughness height. For example, a polished metal specimen can have a surface finish with uniform roughness pattern and a negligible roughness height whereas a sandpaper specimen can have a surface finish with a uniform roughness pattern and a non-negligible roughness height. Further, the surface finish and hence the roughness pattern and the roughness height can be anisotropic. Thus, the roughness pattern or roughness height of the surface finish can vary directionally. Two different materials can have a similar surface finish which can generate a similar skin friction coefficient for the same flow conditions.

The test fixture can include a plate having a cavity configured to receive a circular specimen disk. A specimen, such as a specimen with an anisotropic surface finish can be mounted to the circular specimen disk. A motor can be coupled to the plate to rotate the circular specimen disk. The motor can be commanded remotely. During operation of the test fixture, a fluid can flow over the plate in a particular direction and the motor can rotate the circular specimen disk to determine the effect of the flow angle on the average skin friction coefficient of the surface finish of the material, such as an anisotropic surface finish.

An anisotropic surface finish can have different physical properties, such as a different roughness patterns and roughness heights, when measured in different directions. As described herein, for an anisotropic surface finish, the skin friction coefficient can vary depending on the direction of the fluid flow and how it is aligned with the surface finish. For an isotropic surface finish, the skin friction coefficient is substantially independent of how the fluid flow is aligned with the surface finish.

In other examples, anisotropy can result from gaps or seams between material sections. A circular specimen disk can be formed with gaps, seams or holes between or among the material mounted to the circular specimen. Depending on how the flow aligns with the gaps, seams or holes in the material different average skin friction coefficient can be determined as the circular specimen disk is rotated.

In another example, a material with a particular shape can be mounted to the circular specimen disk, such as a square patch of material. As yet another example, a circular shaped specimen can be mounted to the circular specimen disk where the specimen includes a portion missing, such as a square patch missing. In these examples, as the circular specimen disk is rotated relative to the flow, the shape of the material relative to the flow can change. Hence, the average skin friction coefficient which is determined can vary as the circular specimen disk is rotated relative to the flow.

In yet another example, a combination of materials can be mounted to the circular specimen disk. For example, the circular specimen disk can be covered with a patchwork of specimens with different surface finishes. Depending on the relative surface area of each of the materials, the surface finish of each of the materials and the arrangement of each of the materials on the specimen disk, the average skin friction coefficient which is determined can vary as the circular specimen disk is rotated.

The test fixture can include pressure taps for measuring static pressures. In addition, pressure rakes can be used to measure the total pressures throughout a height of the boundary layer upstream of the circular specimen disk and throughout a height of a downstream of the circular specimen disk. The pressure measurements can be used to determine a velocity distribution across the boundary layer and subsequently, the average skin friction coefficient for the surface finish covering the circular specimen disk. Other measurement systems, described below, can be used to measure total pressures and the example of a pressure rake is provided for the purposes of illustration only.

The test fixture can be modular. For example, the circular specimen disk can easily be attached and detached from the test fixture to allow circular specimen disks with different surface finishes to be tested. As is described with respect to FIGS. 4A and 4B, five different circular specimen disks are tested. Further, the test fixture can include attachment points for securing a trailing edge control surface. The trailing edge control surface can be designed to gradually return the flow to the free stream condition to promote a benign wake.

In more detail, with respect to FIG. 1A, a perspective top view of a test fixture for measuring skin friction is discussed. In this example, the test fixture includes supports for raising it above the floor of a test section of a fluid tunnel. With respect to FIG. 1B, a perspective bottom view of the test fixture is discussed. With respect to FIG. 1C, a top view of the test fixture including the attachment interface for a circular specimen disk used with the test fixture is discussed. With respect to FIG. 1D, a perspective bottom view of the test fixture including fairings is described. The fairings can be used to cover components extending from a bottom of the test fixture and reduce flow disturbances when the fluid flows over a top and a bottom of the test fixture.

Next, with respect to FIG. 2, a perspective view of the test fixture installed in a test section of a fluid tunnel is discussed. With respect to FIG. 3, a method of determining skin friction of an anisotropic surface finish using a test fixture with a rotatable circular specimen disk is described. With respect to FIG. 4A, a plot of average skin friction coefficient determined from measurements made using a test fixture with different rotatable circular specimen disks is described. Finally, with respect to FIG. 4B, a plot of the unit Reynolds number derived at an upstream pressure rake as a function of the test time for the test runs used to obtain the data in FIG. 4A is discussed.

Test Fixture

Next, with respect to FIGS. 1A, 1B, 1C and 1D, details of a test fixture for measuring the average skin friction coefficient of a surface finish of a material is described. FIG. 1A is a perspective top view illustrating a test fixture 10 for measuring the average skin friction coefficient of a surface finish of a material, such as an anisotropic surface finish. The test fixture can include a plate 12 with a top surface 12a.

In one example, the test fixture can include supports, such as 28a, 28b, 28c and 28d (see FIG. 1B) for raising the test fixture above the floor of a fluid tunnel test section. The test fixture 10 can be raised above the floor to avoid the boundary layer of the tunnel floor. As described above, the test fixture 10 can be configured to generate a flow consistent with a flat plate. The boundary layer of the tunnel floor can cause the flow conditions over the top of the plate to diverge significantly from the theoretical flow over a flat plate. Hence, using the supports, the plate 12 can be raised.

In a particular example, the plate 12 can be pitched up (positive angle of attack) or pitched down (negative angle of attack). Further, the plate can be rolled in a positive or negative direction. In one example, shims can be added underneath the supports, such as 28a, 28b, 28c and 28d, to adjust a pitch or a roll of the plate 12. As an example, if shims are added under struts 28a and 28b, the plate 12 can be rolled in a positive direction. As another example, if shims are added under struts 28b and 28d, the plate 12 can be pitched in a negative direction. The pitch or roll adjustments can be used to tune the boundary layer pressure gradients over the plate.

In one example, the plate 12 can be formed from a metal, such as but not limited to aluminum. In a particular example, the plate 12 can be thirty six inches wide and fifty three inches long. However, the plate 12 can be wider or narrower. In addition, the plate 12 can be longer or shorter.

As will be described in more detail with respect to FIG. 1C, the plate 12 can include a cavity for receiving the circular specimen disk 14. A material with a surface finish, such as an anisotropic surface finish can be mounted to the circular specimen disk. The top surface of the circular specimen disk can be aligned with a top surface 12a of the plate 12.

In more detail, the circular specimen disk 14 can have a surface finish with a surface roughness. The surface roughness can include local peaks and valleys. When the circular specimen disk 14 is installed, the local peaks can extend into the flow and above the top surface 12a of the plate 12 as opposed to a top of the local peaks being flush with the top surface 12a. Thus, in some examples, a top of the surface finish can be aligned with the top surface 12a of the plate 12. In other examples, a portion of the surface finish can extend above the top surface 12a of the plate 12.

In one example, the circular specimen disk 14 can be twenty four inches in diameter. However, larger or smaller diameter specimen disks can be utilized. In one example, a leading edge of the circular specimen disk 14 can be located twenty four inches from the leading edge 22 of the plate 12.

The circular specimen disk 14 can be coupled to a motor (see FIGS. 1B and 1C). A flow direction of the fluid over the plate is indicated by arrow 26. The motor can be used to rotate the circular specimen disk 14 through a plurality of angles, such as angle 45. In particular, during a test run in a fluid tunnel in which the test fixture is operated, the circular specimen disk 14 can be rotated through a plurality of angles. Thus, for an anisotropic surface finish, the effects of flow angle on the average skin friction coefficient can be characterized as is shown in FIG. 4A.

The leading edge 22 can be shaped to gradually transition from a finite radius of curvature associated with the leading edge to an infinite radius of curvature associated with the top surface 12a of the plate 12. The shape can reduce local pressure gradients caused by rapid changes in the surface radius of curvature. Large local pressure gradients can cause the flow of the plate 12 to diverge from the flow over a theoretical flat plate. The leading edge is shaped to minimize this divergence.

In one example, the leading edge can be formed as a super ellipse. A super ellipse is described by the formula of absolute value of (x/a) to the nth power+absolute value of (y/a) to the nth power is equal to one. In this example, n can be a fraction. Other shapes are possible and the super ellipse is provided for the purposes of illustration only.

The plate 12 can include attachments for a trailing edge control surface 23. In particular examples, the trailing edge control surface 23 can be removable. An angle of the trailing edge control surface 23 relative to the plate 12 can be adjusted and fixed at a particular orientation. The angle of the trailing edge control surface 23 can affect a location of the pressure stagnation point on the leading edge 22 of the plate 12. Different trailing edge control surfaces, such as longer surfaces, shorter surfaces or differently shaped surfaces, can be attached to the plate 12 to affect the upstream flow in a desired way.

The flow characteristics over the plate 12 can be characterized using pressure rakes and static pressure taps. In one example, two pressure rakes can be utilized. An upstream pressure rake 15 can be configured to characterize the boundary layer on the top surface 12a of the plate upstream of the circular specimen disk 14. A downstream pressure rake 16 can be configured to characterize the boundary layer downstream of the circular specimen disk 14.

The upstream pressure rake 15 is orientated with the pressure probes 20 facing towards the leading edge 22 of the plate 12. The tips of the pressure probes on the upstream pressure rake 15 are aligned with the upstream edge of the circular specimen disk 14. The boundary layer at this location can be referred to as the upstream boundary layer. The upstream boundary layer can be characterized via measurements made using the upstream pressure rake 15.

The downstream pressure rake 16 is orientated with its pressure probes facing towards the leading edge 22 of the plate. The tips of its pressure probes are aligned with the downstream edge of the circular specimen disk 14. The boundary layer at this location can be referred to as the downstream boundary layer. The downstream boundary layer can be characterized via measurements made using the downstream pressure rake 16.

At a particular location, upstream of the particular location can refer to locations opposite the direction of the fluid flow prior to reaching the particular location and downstream can refer to locations along the direction of the fluid flow after the particular location. For example, the flow upstream of the leading edge 22 can refer to the flow prior to reaching the leading edge. The flow downstream of the leading edge 22 can refer to the flow after it passes the leading edge.

Additional pressure rakes can be utilized and this example is provided for the purposes of illustration only. For example, two pressure rakes can be utilized upstream of the circular specimen disk 14 and a single pressure rake can be located downstream of the circular specimen disk 14. In another example, a single pressure rake can be utilized upstream of the circular specimen disk 14 and two pressure rakes can be located downstream of the circular specimen disk 14.

In one example, the pressure rakes can include pressure probes 20. The pressure probes can be used to measure total pressures throughout a height of the boundary layer. In one example, the pressure rakes include eighteen pressure probes. The pressure probe closest to the top surface 12a of the plate 12 can be 0.023 inches above the top surface 12a. The pressure probe farthest from the top surface 12a can be 1.465 inches above the top surface 12a. The pressure probes can extend from the body of the pressure rake such that they are in plane with one another. In one example, the pressure probes can be configured to measure total pressure with an accuracy of +/−0.005 PSI (Pounds per Square Inch).

The tips of the pressure probes can arranged approximately in alignment with one another along a line that is perpendicular to the surface. In one example, the tips of the pressure probes on upstream pressure rake 15 can be approximately aligned with a point on the circular specimen disk 14 which is most upstream in a flow of the fluid over the circular specimen disk 14. Thus, the pressure probes can be used to characterize the boundary layer just before it reaches the circular specimen disk 14. The placement of the upstream pressure rake 15 off to the side of the circular specimen disk 14 and behind the beginning of the circular specimen disk 14 allows for this alignment.

The tips of the pressure probes on the downstream pressure rake 16 are approximately aligned with a point on the circular specimen disk which is most downstream in a flow of the fluid over the circular specimen disk 14. Thus, the pressure probes can be used to characterize the boundary layer just after it has passed over the circular specimen disk 14. The placement of the upstream pressure rake 15 along a line 46 through the center of the circular specimen disk 14 in the streamwise direction allows for this characterization.

The streamwise direction can be along lines which are perpendicular the leading edge 22 of the plate 12 and parallel to lines which run along a length of the plate. The flow direction, as shown by arrow 26, can be substantially aligned with the streamwise direction. The span wise direction can be along lines which are parallel to the leading edge 22 of the plate 12.

The test fixture 10 is designed for a fluid to flow over the leading edge 22. The thickness of the boundary layer, such as boundary layer 35, grows as the fluid moves along the plate 12 in the streamwise direction. For the test conditions used to obtain the skin friction measurements shown in FIG. 4, the pressure probes on the upstream pressure rake 15 and the downstream pressure rake 16 were of sufficient height to capture the entire extent of the boundary layer normal (i.e., perpendicular) to the top surface 12a of the plate 1.

The boundary layer 35 can be a laminar or a turbulent boundary layer. Typically, a turbulent boundary layer is thicker than a laminar boundary layer. The pressure probes were sufficiently spaced to characterize the thicker turbulent boundary layer.

For different test conditions, the height of the boundary layer can be thinner or thicker. In some instances, to accommodate a thinner or thicker boundary layer, pressure rakes with more pressure probes or less pressure probes can be used. Further, pressure rakes with pressure probes with different spacing distributions can be utilized. For example, the pressure probe farthest from the top surface 12a can be located closer or farther away from the top surface 12a than the 1.465 inches described above. In another example, more than eighteen pressure probes or less than eighteen pressure probes can be utilized. Yet further, the upstream pressure rake 15 and the downstream pressure rake 16 can each utilize a different number of pressure probes where the pressure probe spacing is different for each pressure rake, such as upstream pressure rake 15 or downstream pressure rake 16.

The pressure rakes, such as 15 or 16, can be secured to the plate 12 with fasteners, such as removable screws. The design allows the pressure rakes to be removed and replaced with pressure rakes with different pressure probe spacing distributions. This modular aspect of the test fixture 10 can allow different test conditions to be more easily accommodated.

In practice, the pressure probes can be slightly tilted and may not be parallel to the top surface 12a of the plate 12. To account for the misalignments, the heights of the probes above the top surface 12a of the plate 12 can be measured, such as just prior to or just after the test fixture 10 is installed in a tunnel test section. In one example, the heights of the pressure probes can be measured to an accuracy of +/−0.001 inches. These measurements can be used for the determination of boundary layer parameters that involve height information.

The pressure rakes, such as 15 or 16, can each include a body, such as 18. The pressure probes 20 extend from the body. The body, such as 18, can be aerodynamically shaped. The aerodynamic shape can be selected to reduce downstream pressure disturbances that can affect the skin friction measurements. For example, flow disturbances caused by the upstream pressure rake 15 that would be measured by the downstream pressure rake 16.

In addition, a position of the upstream pressure rake 15 can be offset in the spanwise direction from the downstream pressure rake 16. For example, the downstream pressure rake 16 is located along a line 46 that passes through the center of the circular specimen disk in the streamwise direction. Whereas, the upstream pressure rake 15 is offset in the spanwise direction from the line 46. The offset can help reduce and minimize flow disturbances causes by the upstream pressure rake 15 from being measured by the downstream pressure rake 16.

In alternate examples, different measurement systems can be used to characterize the upstream boundary layer and the downstream boundary layer. These measurement systems can include but are not limited to a total pressure probe on a traverse system, particle imaging velocimetry (PIV) and hot wire anemometry. Thus, the example of a pressure rake is provided for the purposes of illustration only and is not meant to be limiting.

The plate 12 can include static pressure taps, such as static pressure taps 25. In one example, the plate 12 includes thirty four static pressure taps for characterizing the flow quality. For example, the thirty four static pressure taps can be used to assess whether zero pressure gradients, or flat plate pressure gradients are being maintained over the plate 12 in the streamwise and the spanwise directions.

In one example, sixteen pressure taps can be located in a streamwise line 47. Further, thirteen taps can be located in a spanwise line 48 where one of the taps is included in the streamwise line 47. In addition, three pressure taps (not shown) can each be located on a top surface 12a of the plate 12 and three pressure taps can each be located a bottom surface of the plate (see FIG. 1B) near the leading edge 22.

Each static-pressure tap can be inspected for defects with a digital microscope and both the static taps and pressure probes can be cleared of debris using compressed air. All pressure lines can be leak checked prior to testing. The testing can identify pinched or disconnected lines. The static pressures can be measured to an accuracy of +/−0.005 psi. Tunnel conditions can be measured to an accuracy of +/−0.00036 psi. However, all pressures can be measured to an accuracy of +/−0.00036 psi or better if desired.

As described above, the pressure probes and static pressure taps can be coupled to pressure lines. The pressure lines can run through channels in the plate 12 and connect to instrument modules (see FIG. 1Bb). The instrument modules can include pressure sensors for measuring pressures received from the pressure probes and static pressure taps via the pressure lines.

The test fixture 10 can be part of a test fixture system which includes a data acquisition system, power conditioning system 40 and fixture control system 42. Data 32 from the instrument modules can be output via a wire bundle 30 to a data acquisition system 38. In addition, via the wire bundle 30, the motor can receive power 34 from a power conditioning system including a power source. The wire bundle 30 can extend out of one of the sides of the plate 12 (see FIG. 1B).

Further, via the wire bundle 30, a fixture control system 42 can send commands to control the motor to rotate the circular specimen disk 14. The fixture control system 42 can receive information from the test fixture, such as a current position of the circular specimen disk 14 or information related to a state of the motor. During a test run in which the test fixture is operated, the fixture control system 42 can rotate the circular specimen disk through a plurality of angles. For example, a sweep of one hundred eighty degrees is used for the test runs described with respect to FIGS. 4A and 4B.

As described above, the test fixture 10 can be used with a laminar or turbulent boundary layer. In one example, a trip strip (not shown) can be used to trip the boundary layer to transition it to a turbulent flow. The trip strip can be comprised of a one-dimensional array of short cylinders.

In one example, the trip strip can be located approximately 1.5 inches downstream of the leading edge 22 and centered around the line 46 that passes through a center of the circular specimen disk 14. This trip strip can robustly and uniformly trip the flow at the desired unit Reynolds to promote a uniform, turbulent boundary layer over the surface specimen on the circular specimen disk 14. The trip strip functionality can be validated via infrared thermography.

FIG. 1B is a perspective bottom view illustrating a test fixture 10 for measuring skin friction. The four supports, 28a, 28b, 28c and 28d, and the bottom surface of plate 12b are visible. In addition, three static pressure taps 54 near the leading edge 22 are shown. Although not shown in FIG. 1A, three static pressure taps can also be provided near the leading edge 22 of the top surface 12a of the plate 12.

The motor assembly 52 can control rotation of the circular specimen disk 14. The motor assembly 52 can be remotely commanded to allow an angular position of the circular specimen disk to be changed during a test run. During a test run in which the test fixture is operated, a fluid can be continuously flowing over the test fixture. The motor assembly 52 can include a communication interface to allow the motor assembly to communicate with a fixture control system. For example, via the communication interface, command signals to control the motor assembly can be communicated. Further, a status of the motor assembly can be communicated.

The pressure probes in the pressure rakes and the static pressure taps can each be coupled to pressure tubing on a first end. A second end of the pressure tubing for each pressure probe or static pressure tap can be coupled to the instrument modules 50. The instrument modules 50 can be configured to determine a pressure value based upon the pressure in the pressure tubing at the second end Data 32 determined from the instrument modules 50 can be send to a data acquisition system 38 via the wire bundle 30 (see FIG. 1A).

The pressure tubing can be routed through channels (not shown) in the plate 12. The channels can be covered with removable channel covers. The channel covers can be removed to install and connect the pressure tubing. After the pressure tubing is installed, the channel covers can be secured to the plate.

A channel to the motor assembly 52 can allow power and communications cables to be coupled to the motor assembly 52. Further, a channel to the instrument modules 50 can allow a cable for communicating data to be routed to the instrument modules 50. The exit 56 can be the end of a channel in plate 12. Power and data cables in a wire bundle can extend from the exit 56 of the channel and can be coupled on one end to a data acquisition system 38, power conditioning system 40 and fixture control system 42 as shown in FIG. 1A.

The motor assembly 52 and instrument modules 50 can extend above the bottom surface of the plate 12b. In some examples, when the fluid flows beneath the plate 12, the components can be covered with aerodynamic failings (see FIG. 1D). The aerodynamic fairings can be used to reduce flow disturbances associated with the fluid flowing over these components.

FIG. 1C is a perspective top view of a test fixture 10 illustrating the attachment interface 70 for the circular specimen disk 14 used with the test fixture. In FIG. 1C, the circular specimen disk 14 is shown in a detached position to allow the underlying attachment interface 70 to be exposed. In operation, a plurality of circular specimen disks, such as 14, can be maintained. For example, five different circular specimen disks were generated for the test runs described below with respect to FIGS. 4A and 4B. Different materials with different surface finishes can be mounted to each of the circular specimen disks. The different circular specimen disks can be swapped out with another to allow the different surface finishes to be tested.

The attachment interface 70 includes a disk cavity 74. Three disk support pads 72a, 72b and 72c are located in the disk cavity 74. When the circular specimen disk 14 is seated in the disk cavity 74, the circular specimen disk 14 can rest on the disk support pads, 72a, 72b, 72c. The height of the disk support pads, the depth of the disk cavity 74 and the thickness of the circular specimen disk 14 can be selected so that the top of the circular specimen disk including the mounted material having a surface finish that is to be tested is approximately even with a top surface 12a of the plate 12.

As described above, for rough specimens, the circular specimen disk 14 can be adjusted such that only a roughness height of the surface finish extends above the top surface 12a of the plate 12. For example, for rough specimens, such as a sand paper specimen, the circular specimen disk 14 can be adjusted such that only the grit particles protrude above the top surface 12a of the plate 12. Besides the height of the grit particles, the circular specimen disk 14 can be installed such that no part of the circular specimen disk 14 or even the thickness of the sandpaper sheets protrudes.

The disk cavity 74 can include an aperture 78. A motor assembly interface 76, which is coupled to the motor, extends through the aperture 78. The circular specimen disk 14 can be coupled to the motor assembly interface 76. After the circular specimen disk 14 is coupled to the motor assembly interface 76, it can receive a torque from the motor which causes it to rotate.

In one example, a specimen having a surface finish can be adhered to a steel disk to form the circular specimen disk. The circular specimen disk 14 can be shimmed such that only the roughness pattern of the specimen protrudes above the top surface of the plate 12, i.e. a smooth specimen can be completely flush with the top surface 12a of the plate. If a small mismatch occurs, the circular specimen disk 14 can be shimmed to accommodate the smallest protrusion or, ideally, only backward-facing steps. The circular specimen disk can ride on Teflon pads, such as disk support pads 72a, 72b and 72c. The shims can be arranged under the pads to obtain the most level disk top surface possible, as measured by a height gage before each test run in which the test fixture is operated.

FIG. 1D is a perspective bottom view of a test fixture 10 illustrating fairings, 80 and 82, used to cover components extending from a bottom of the test fixture. As described above, the fairings can be used to reduce aerodynamic disturbances associated with the flow of a fluid around the components extending from the bottom surface of plate 12b. In some examples, the test fixture can have flow over only the top of the plate. In these instances, the fairings may not be utilized.

As shown in FIG. 1B, a motor assembly and instrument modules can extend from a bottom surface of the plate 12b. Thus, a first fairing 80 is shown, which is placed over the motor assembly. A second fairing 82 is shown, which is placed over the instrument modules 50. If additional components extend from a bottom of the plate, then additional fairings can be utilized. Further, if the instrument modules and the motor assembly were placed closer together, then two fairings can be combined into a single fairing.

FIG. 2 is a perspective view of the test fixture 10 installed in a test section 102 of a fluid tunnel. The fluid tunnel is a component of a testing system 100, which includes a fluid driver system 112, tunnel control system 114, test fixture 10, data acquisition system 38, power conditioning system 40 and fixture control system 42. The fluid driver system 112 can be configured to drive the fluid through the test section 102 and over the test fixture 10. For example, in a wind tunnel, the fluid driver system can be fans.

In alternate examples, the fluid can be stationary and test fixture 10 can be driven through the test section 102. For example, in water tow tank, a test fixture 10 can be pulled through the test section 102. Thus, instead of a fluid driver system 112, a test fixture driver system (not shown) can be utilized.

The tunnel control system 114 can be configured to control the fluid driver system 112 to maintain a selected test condition in the test section 102. The tunnel control system 114 can be coupled to sensors, such as sensors 116 located in the test section 102. The sensors 116 can be used to measure tunnel conditions, such as pressure, velocity and temperature.

In one example, the sensor data can be used to determine a unit Reynolds number and the tunnel control system can be configured to maintain an approximately constant unit Reynolds number during a test run in which the test fixture is operated. The unit Reynolds number can be the Reynolds number based upon a unit length, such as one foot for English Units or one meter for metric units. The unit Reynolds number is a function of temperature. Thus, the velocity of the fluid in the test section can be increased or decreased to account for temperature changes in the test section.

In one example, the fluid tunnel can be a closed-loop and low-speed wind tunnel. The test section of the wind tunnel can include ceiling panels (not shown) that are adjustable in height and angle. The ceiling panels can be used to adjust the boundary layer pressure gradient over the test fixture 10. In addition, the shims can be placed under the supports of the test fixture 10 to adjust an angle of the test fixture and hence, alter the boundary layer pressure gradient. As described above, to accommodate flat plate boundary layer theory, a constant edge velocity condition, zero pressure gradient condition over the test fixture can be desired.

A total-temperature Pitot-static probe can be stationed at the x-location along x coordinate 120, of the leading edge of the test fixture and at the y-location, along y coordinate 121, midway between the top of the test fixture and the ceiling of the tunnel. The velocity calculated from this Pitot-static probe can be used by the tunnel control system to control the tunnel to target a free stream velocity or a unit Reynolds number. In some examples, it was found controlling to a unit Reynolds numbers allows for a more repeatable test as compared to controlling to a target free stream velocity. Thus, tunnel control system 114 can be configured to control the tunnel to a unit Reynolds number set point by adjusting the tunnel fan speed, and thereby free stream velocity. The changes to the free stream velocity can be used to compensate for drifts in test section temperature over the course of a long test run.

In one example, the test section dimensions are 27.5 inches from floor to ceiling, the width of the test section 102 from sidewall 106a to sidewall 106b is thirty six inches and the length of the test section 102 is one hundred forty four inches. The maximum dynamic pressure is 26 pounds per square foot and the free stream velocity is one hundred fifty five feet per second. The maximum free stream Mach number is 0.14 and maximum unit Reynolds number is $8.95 \times 10^5$/ft.

Tunnels with different designs and conditions can be utilized and this example is provided for the purposes of illustration only and is not meant to be limiting. For example, a non-closed loop tunnel configured to operate at higher Mach number can be utilized. Further, the test fixture design can be used in fluid tunnels that drive fluids other than air, such as a water tunnel. In general, the design can be used for tunnels that drive a liquid or a gas.

In FIG. 2, the test fixture 10 is raised above a floor 108 of the test section 102. Thus, the fluid can flow above and below the test fixture. The gaps between the test fixture 10 and the side wall 106a and the sidewall 106b can be sealed. For example, the gaps can be sealed with an adhesive foam.

The seals can be used to prevent a leakage of fluid from a top of the test fixture to a bottom of the test fixture.

The leakage of fluid can refer to the fluid flow following a pressure gradient between a top surface of the plate and a bottom surface of the plate. The leakage of fluid can introduce pressure gradients that cause the test fixture to diverge from flat plate boundary layer theory. The static pressure taps can be used to detect if any spanwise or streamwise pressure gradients are occurring.

In an alternate example, the test fixture can be mounted such that a top surface of the test fixture is flush with the floor 108 of the test section 102. Thus, the fluid can flow only along a top surface of the test fixture 10 and the test fixture supports are not utilized. In another example, a bottom of the test fixture can be mounted to the floor of the test section. Thus, a top of the test fixture can extend above the floor 108. In both instances, a boundary layer can build up along the floor 108 of the test section prior to reaching test fixture. The built up boundary layer can cause the flow over the test fixture to diverge from flat plate boundary layer theory.

To reduce the boundary layer build up in this configuration, a suction mechanism can be used. The suction mechanism can be installed in the floor of the tunnel ahead of the test fixture embedded in the floor. The suction mechanism can be designed to reduce the boundary layer thickness prior to reaching the test fixture.

The test section 102 includes a tunnel turntable 110. The tunnel turntable 110 can be used to rotate a model in a test section. In one example, the tunnel turntable 110 can adapted to form a test fixture. Pressure rakes can be installed upstream and downstream of the tunnel turntable 110 like in test fixture 10. Further, pressure taps can be installed around the tunnel turntable 110 like test fixture 10. Then, a specimen having a surface finish that is to be tested can be mounted to the tunnel turntable such that it is flush with the floor 108. The rotation of the tunnel turntable 110 can be used to rotate the specimen relative to the flow direction to characterize anisotropic surface finish effects as previously described above.

FIG. 3 is a method 200 of determining skin friction of an anisotropic surface finish using a test fixture with a rotatable specimen disk. In 202, the test fixture can be configured for a test run. The configuration process can involve attaching a material having the surface finish to the circular specimen disk and securing the circular specimen disk to the test fixture. Once secured, the height of the circular specimen disk relative to the surrounding portions of the test fixture can be measured. If necessary, shims can be used to minimize any height differences.

In addition, pressure checks can be performed. The pressure checks can be performed to insure the instrumentation is measuring all of the pressures properly. For example, the pressure checks can identify a pinched pressure line or a disconnected pressure line that is preventing the pressure from being measured properly. Yet further, as described above, the heights of the pressure probes above a height of the test fixture can be measured.

In 204, the tunnel can be started up and the fluid driver system can be controlled to reach a desired test condition. For example, a tunnel control system can be used to establish a selected unit Reynolds number for the test run. The control can involve adjusting parameters of a fluid driver system which drive the fluid through the tunnel. For example, in a wind tunnel, a speed of fans which push air through the tunnel can be adjusted. During a test run in which the test fixture is operated, the tunnel control system can be configured to maintain a desired test condition at an approximately constant value.

A tunnel control system can be coupled to a plurality of sensors. For example, a plurality of sensors, such as temperature and pressure sensors, can be located in a test section of the tunnel. In 206, the tunnel control system can receive sensor data from a plurality of sensors. In 208, based upon the sensor data, the control system can determine whether a selected test conditions is established in a test section of the tunnel and whether it is being maintained. A feedback control system can be used to maintain the test conditions at selected values.

In 210, when it is determined that the selected test conditions have been established in the tunnel, data acquisition can begin. In particular, data associated with pressure measurements from the test fixture can be captured. The circular specimen disk can be set to a first angle for the initial measurements. Besides data from the test fixture, sensor data from sensors in the test section can also be captured. The data from these sensors can be used to determine the free stream flow conditions in the test section. This information is used to derive the average skin friction coefficient for the surface finish on the specimen disk at the first angle.

A determination can be made that sufficient data is captured at a first angle. For example, at each angle of the specimen disk, data can be captured for some time period. In one example, the skin friction coefficient can be an average value over the surface finish of the specimen disk. In addition, local values of the skin friction coefficient on the specimen disk can also be determined.

In 212, after it is determined sufficient data is captured at the first angle, the motor assembly can be configured to rotate the circular specimen disk to a new angle. In 214, as described above, the tunnel can be controlled to maintain the desired test conditions if needed. This control can occur in a continuous manner during a test run. For example, if the temperature in the test section changes during the test, the fluid driver system, such as fans in a wind tunnel, can be adjusted to change the velocity in the test section to maintain an approximately constant unit Reynolds number. In 216, data from the test fixture and test section can be acquired at the new angle.

In 218, the control system can determine whether data needs to be acquired at any more angles. For example, data can be acquired for a three hundred sixty degree rotation of a circular specimen disk at ten degrees increments. Thus, the circular specimen disk can be rotated through angles of zero, ten, twenty, thirty up to three hundred fifty degrees. In another example, the angle increments can be randomly varied.

When there are additional angles to be considered, the method can return to step 212 and the motor assembly can rotate the specimen disk to a new angle. When measurements have been made at all of the plurality of angles associated with a test run, the skin friction can be determined as a function of angle for the surface finish on the circular specimen disk. An example of values from this determination is described as follows with respect to FIGS. 4A and 4B. The theory used to determine the values of the skin friction coefficient and a comparison with theory is described in U.S. Provisional Patent Application Ser. No. 62/675,087, filed May 22, 2018, titled, "A Test Fixture to Measure the Skin Friction of Anisotropic Surface," previously incorporated herein.

FIG. 4A is a plot 300 of skin friction coefficient determined from measurements made using a test fixture with a rotatable specimen disk. In this example, measurements were made for the bare and smooth metal of the specimen disk, the specimen disk coated with a smooth film, a specimen disk covered with sand paper, a specimen disk coated with a first anisotropic film and a specimen disk coated with a second anisotropic film. Thus, a total of five circular specimen disks were tested. The sandpaper grit size is chosen to match the approximate feature height of the anisotropic films to facilitate comparison of results.

The two anisotropic films include repeating patterns of homogeneous extrusions across their extent, with the span of the patterns perpendicular to incoming air flow at $\psi=0$ and $\psi=80$ and the span of the patterns parallel to the incoming air flow at $\psi=90$ and $\psi=270$ where $\psi$ is the angle between the circular specimen disk and the flow direction. The anisotropic film patterns are chosen for the purposes of illustration only and are not to be limiting.

As shown in FIG. 4A, the blank and smooth specimens produce the lowest average skin friction coefficient ($C_F$) and their average skin friction coefficients are approximately independent of flow angle. The sandpaper specimen produces larger average skin friction coefficients than the former two specimens and its average skin friction coefficient is independent of the flow angle. The two anisotropic specimens produce the highest average skin friction coefficients and are strongly dependent on flow angle.

A number of test runs were performed to gather the data used to generate the average skin friction coefficient predictions in FIG. 4A. Test runs included sweeping through 180° in two blocks with $\psi$ set randomly within each block. Sixty samples are recorded at each angle at a one-Hz sampling rate. Each 180° sweep provided measurements at thirty six different angles. The length of a test run including each sweep was about two hours.

All five specimen disks are tested at approximately the same unit Reynolds number which corresponded to a free stream Mach number of approximately 0.14. Throughout a run, either the free stream velocity in the test section or the unit Reynolds number in test section is held approximately constant. The metal and smooth-film specimen disks are tested with constant free stream velocity control while the sandpaper and anisotropic films are tested with the unit Reynolds number controlled and set to a unit Reynolds number that matches preceding tests. FIG. 4B is a plot 400 of the unit Reynolds number as a function of time for the different tests as determined at the upstream rake. The maximum difference in the unit Reynolds between any two points was about 2.3 percent.

Conclusion

Different examples and aspects of the apparatus and methods are disclosed herein that include a variety of components, features, and functionality. In particular, apparatus and methods associated with a test fixture used to measure skin friction coefficients are discussed. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. A test fixture for measuring skin friction of a surface finish on a material comprising:
    a plate including a circular cavity configured to receive a circular specimen disk having the surface finish wherein the surface finish is aligned with a top surface of the plate when the circular specimen disk is placed in the circular cavity and wherein during operation of the test fixture a fluid flows over the plate and the circular specimen disk;
    a motor assembly, coupled to plate, configured to rotate the circular specimen disk through a plurality of angles relative to a direction of a fluid flow during operation of the test fixture;
    a first pressure rake, coupled to the plate, positioned upstream of the circular specimen disk, configured to measure first total pressures throughout a height of an upstream boundary layer;
    a second pressure rake, coupled to the plate, positioned downstream of the circular specimen disk, configured to measure second total pressures throughout a height of a downstream boundary layer; and
    a plurality of static pressure taps in a top surface of the plate for measuring static pressures on the top surface of the plate wherein the first total pressures, the second total pressures and the static pressures are used to determine the skin friction of the surface finish as a function of the plurality of angles.

2. The test fixture of claim 1 wherein the first pressure rake includes a plurality of pressure probes each extending from a body of the first pressure rake, each arranged along a line perpendicular to the top surface of the plate and each substantially parallel to the top surface of the plate.

3. The test fixture of claim 2, wherein tips of the plurality of the pressure probes are aligned with a point on the circular specimen disk which is most upstream in a flow of the fluid over the circular specimen disk.

4. The test fixture of claim 1 wherein the second pressure rake includes a plurality of pressure probes each extending from a body of the second pressure rake, each arranged along a line perpendicular to the top surface of the plate and each substantially parallel to the top surface of the plate wherein tips of the pressure probes are aligned with a point on the circular specimen disk which is most downstream in a flow of the fluid over the circular specimen disk.

5. The test fixture of claim 1 wherein a portion of the plurality of static pressure taps is arranged in a spanwise line across the plate upstream of the circular specimen disk.

6. The test fixture of claim 1 wherein a portion of the plurality of static pressure taps is arranged in a streamwise line along the plate extending from upstream of the circular specimen disk to downstream of the circular specimen disk.

7. The test fixture of claim 1, further comprising a communication interface configured to receive command signals for the motor assembly, wherein the command signals are used to command the motor assembly to rotate the circular specimen disk during the operation of the test fixture.

8. The test fixture of claim 1, further comprising a plurality of supports for raising the test fixture above a floor of a test section of a fluid tunnel.

9. The test fixture of claim 8, further comprising one or more fairings designed to cover components extending from a bottom of the plate wherein the one or more fairings are shaped to reduce flow disturbances resulting from the fluid flowing over the fairings.

10. The test fixture of claim 1, wherein a body of the first pressure rake or a body of the second pressure rake is shaped to reduce downstream flow disturbances resulting from the fluid flowing around the body.

11. The test fixture of claim 1, wherein the plate includes a leading edge and a trailing edge and wherein the trailing edge includes attachment points for receiving a trailing edge control surface.

12. The test fixture of claim 1, wherein, to reduce downstream flow disturbances, the plate includes a leading edge and a trailing edge, and wherein the leading edge is shaped to gradually transition from a finite radius of curvature associated with the leading edge to an infinite radius of curvature associated with the top surface of the plate, which is planar.

13. A material testing system comprising:
a fluid tunnel including a test section, a fluid driver system for driving a fluid through the test section and a control system for controlling the fluid driver system;
a test fixture, positioned in the test section, for measuring skin friction of a surface finish on a material including:
a plate including a circular cavity configured to receive a circular specimen disk having the surface finish wherein the surface finish is aligned with a top surface of the plate when the circular specimen disk is placed in the circular cavity and wherein, during operation of the test fixture the fluid flows over at least the top surface of the plate and the circular specimen disk;
a motor assembly, coupled to plate, configured to rotate the circular specimen disk through a plurality of angles relative to a direction of a fluid flow during operation of the test fixture;
a first pressure rake, coupled to the plate, positioned upstream of the circular specimen disk, configured to measure first total pressures throughout a height of an upstream boundary layer;
a second pressure rake, coupled to the plate, positioned downstream of the circular specimen disk, configured to measure second total pressures throughout a height of a downstream boundary layer; and
a plurality of static pressure taps in the top surface of the plate for measuring static pressures on the top surface of the plate wherein the first total pressures, the second total pressures and the static pressures are used to determine the skin friction of the surface finish as a function of the plurality of angles.

14. The material testing system of claim 13, wherein the plate is mounted in the test section such that the top surface of the plate is flush with a bottom surface of the test section.

15. The material testing system of claim 14, further comprising a suction mechanism installed in the bottom surface of the test section, upstream of the plate, to eliminate and remove an effect of a boundary layer upstream of the plate.

16. The material testing system of claim 13, further comprising supports configured to raise the plate above a bottom surface of the test section to allow the fluid to flow over the top surface of the plate and a bottom surface of the plate.

17. The material testing system of claim 16, wherein gaps between spanwise edges of the plate and side walls of the test section are sealed to minimize a leakage of fluid between the top surface of the plate and the bottom surface of the plate.

18. The material testing system of claim 13, wherein the control system is configured to control the fluid driver system to maintain an approximately constant unit Reynolds number during the operation of the test fixture.

19. The material testing system of claim 13, wherein the control system is configured to control the motor assembly to rotate the circular specimen disk through the plurality of angles during the operation of the test fixture.

20. A method of determining skin friction of an anisotropic surface finish on a material comprising:
controlling a fluid tunnel to establish fluid flow over a test fixture wherein the test fixture includes a circular specimen disk and is positioned within a test section of the fluid tunnel;
measuring first total pressures, second total pressures and static pressures when a circular specimen disk is at a first angle relative to the direction of the fluid flow during the operation of the test fixture;
commanding a motor assembly to rotate the circular specimen disk to a second angle relative to the direction of the fluid flow during the operation of the test fixture;
measuring the first total pressures, the second total pressures and the static pressures at the second angle and;
based upon the first total pressures, the second total pressures and the static pressures at the first angle and at the second angle, determining a skin friction coefficient of the anisotropic surface finish as a function of the first angle and the second angle.

* * * * *